United States Patent
Saito

(10) Patent No.: US 8,649,055 B2
(45) Date of Patent: Feb. 11, 2014

(54) IMAGE PROCESSING APPARATUS AND COMPUTER READABLE MEDIUM

(75) Inventor: Kazuo Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 309 days.

(21) Appl. No.: 13/110,029

(22) Filed: May 18, 2011

(65) Prior Publication Data

US 2012/0105917 A1    May 3, 2012

(30) Foreign Application Priority Data

Nov. 1, 2010 (JP) ................................. 2010-244995

(51) Int. Cl.
    *H04N 1/40* (2006.01)
(52) U.S. Cl.
    USPC .......................................... 358/1.9; 358/468
(58) Field of Classification Search
    USPC ................. 358/1.9, 2.1, 448–449, 468, 474; 382/173–177, 181, 306–309
    See application file for complete search history.

(56) References Cited

U.S. PATENT DOCUMENTS

| | | | | |
|---|---|---|---|---|
| 5,251,273 A | * | 10/1993 | Betts et al. | 382/311 |
| 5,896,403 A | | 4/1999 | Nagasaki et al. | |
| 5,920,658 A | * | 7/1999 | Yamagata et al. | 382/293 |
| 6,548,768 B1 | | 4/2003 | Pettersson et al. | |
| 6,663,008 B1 | | 12/2003 | Pettersson et al. | |
| 6,674,427 B1 | | 1/2004 | Pettersson et al. | |
| 2004/0160430 A1 | | 8/2004 | Tokunaga et al. | |

FOREIGN PATENT DOCUMENTS

| | | |
|---|---|---|
| JP | 6-75795 A | 3/1994 |
| JP | 6-103390 A | 4/1994 |
| JP | 10-187910 A | 7/1998 |
| JP | 2003-263267 A | 9/2003 |
| JP | 2003308169 A | 10/2003 |
| JP | 2004-246433 A | 9/2004 |
| JP | 2006-141061 A | 6/2006 |

* cited by examiner

*Primary Examiner* — Thomas D Lee
*Assistant Examiner* — Stephen M Brinich
(74) *Attorney, Agent, or Firm* — Sughrue Mion, PLLC

(57) ABSTRACT

An image processing apparatus includes an image output apparatus and an image reading apparatus. The image output apparatus includes an entry order acceptance module, an information image generation module, a combining module, an image output module. The image reading apparatus includes a reading module, an extraction module, a determination module, and an alarm module.

12 Claims, 12 Drawing Sheets

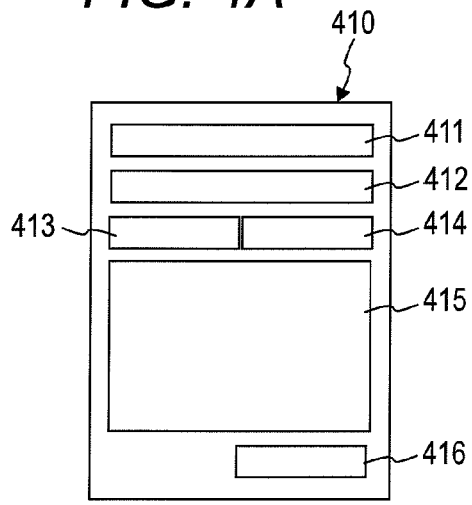
FIG. 4A
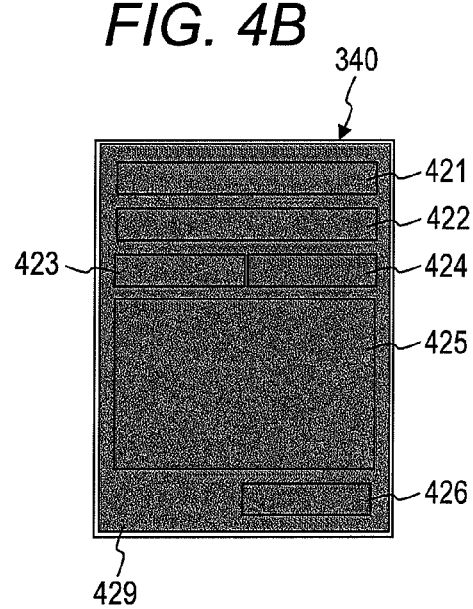
FIG. 4B
FIG. 5
| ENTRY FIELD ID | ENTRY ORDER |
|---|---|
| ENTRY FIELD a | 1 |
| ENTRY FIELD b | 3 |
| ENTRY FIELD c | 2 |
| ⋮ | ⋮ |
FIG. 6
| ENTRY FIELD ID | POSITION | HIGHT | WIDTH |
|---|---|---|---|
| ENTRY FIELD a | (Xa, Ya) | H | W |
| ENTRY FIELD b | (Xb, Yb) | H | W |
| ENTRY FIELD c | (Xc, Yc) | H | W |
| ⋮ | ⋮ | ⋮ | ⋮ |

PATTERN 0

PATTERN 1

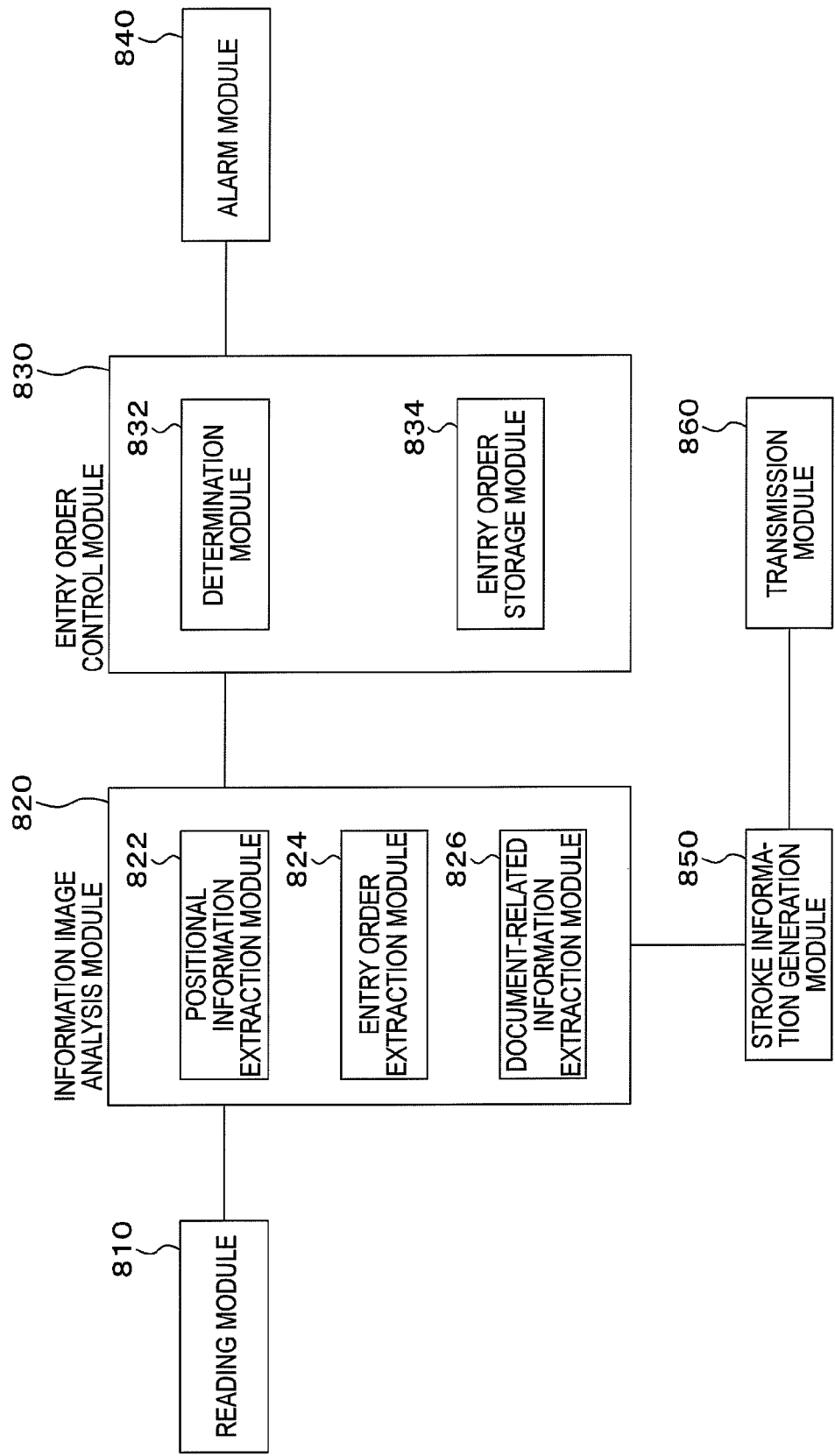

| DOCUMENT ID | X-COORDINATE | Y-COORDINATE |
|---|---|---|
| 12345 | 100 | 100 |
| 12345 | 104 | 100 |
| 12345 | 105 | 102 |
| ... | | |

1110, 1120, 1130, 1100

| FINAL ENTRY ORDER |
|---|
| 2 |

1210, 1200

| DOCUMENT ID | PAGE ID | FINAL ENTRY ORDER |
|---|---|---|
| 12345 | 1 | 2 |

1310, 1320, 1330, 1300

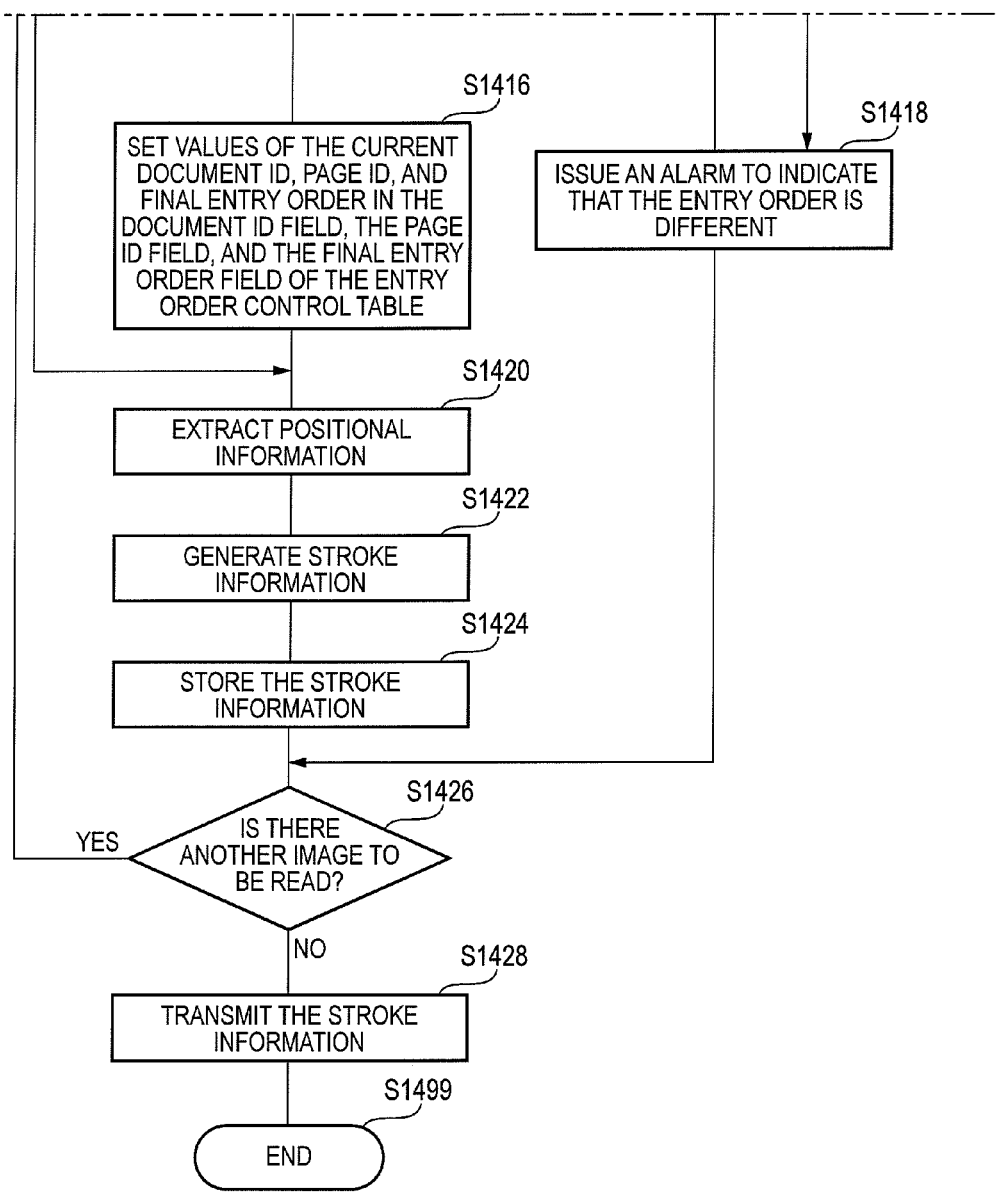

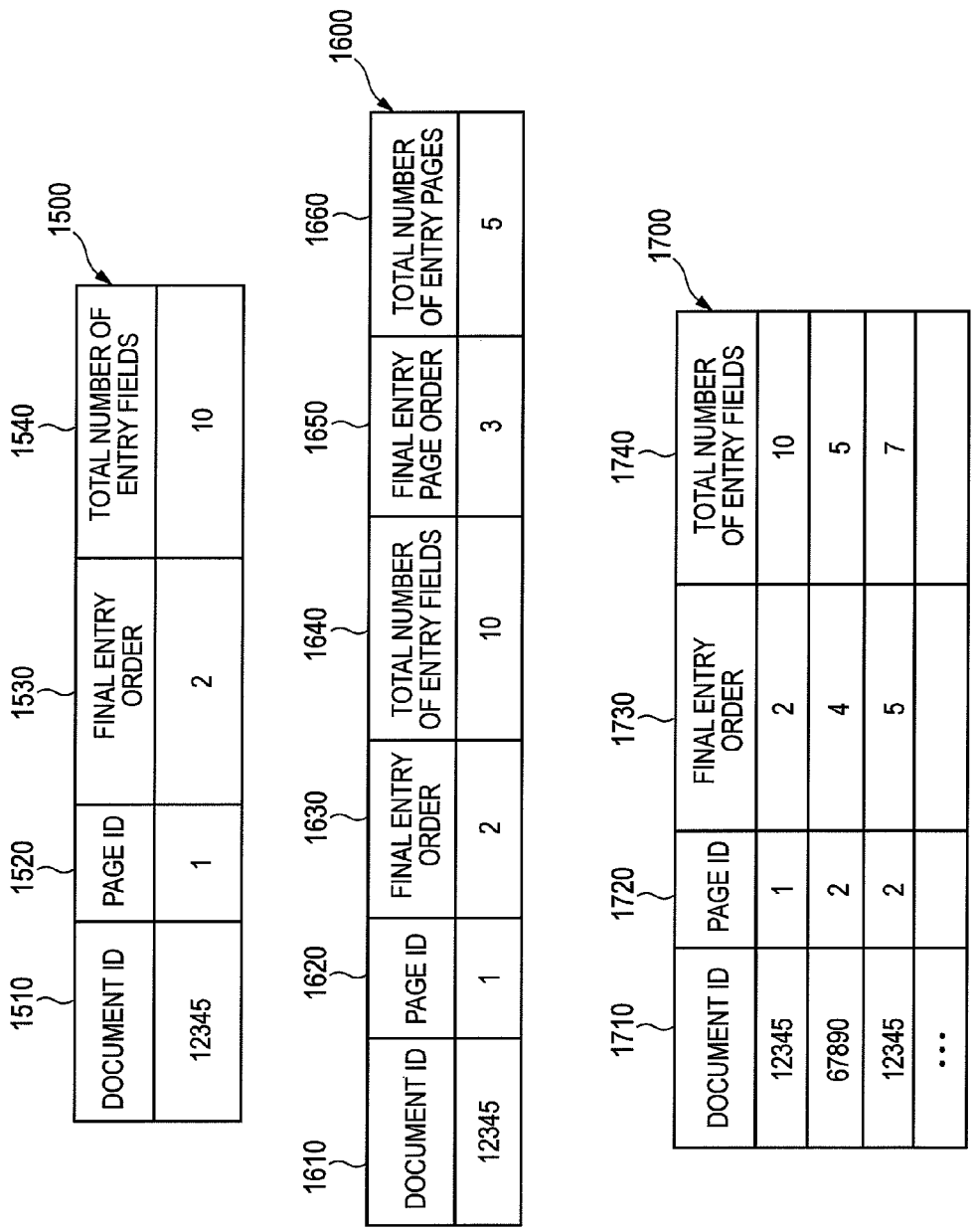

IMAGE PROCESSING APPARATUS AND COMPUTER READABLE MEDIUM

CROSS-REFERENCE TO RELATED APPLICATIONS

This application is based upon and claims priority under 35 USC 119 from Japanese Patent Application No. 2010-244995, filed Nov. 1, 2010.

BACKGROUND

1. Technical Field

The present invention relates to an image processing apparatus and a computer readable medium.

2. Related Art

Techniques are known concerning the configuration of an information image arranged on a recording medium and read control of information written in the recording medium with the information image arranged thereon.

SUMMARY OF THE INVENTION

According to an aspect of the invention, an image processing apparatus includes an image output apparatus and an image reading apparatus. The image output apparatus includes an entry order acceptance module, an information image generation module, a combining module, an image output module. The image reading apparatus includes a reading module, an extraction module, a determination module, and an alarm module. An entry order acceptance module accepts an entry order in entry fields within a document. The information image generation module generates an information image representing given information based on positional information representing a position in the document and the entry order accepted by the entry order acceptance module. The combining module combines the information image generated by the information image generation module in the entry field within the document. The image output module outputs the document with the information image combined with the document by the combining module. The reading module reads the information image which is outputted to a medium by the image output device and which is for extracting a position of writing with a writing instrument. The extraction module extracts the entry order by analyzing the information image read out by the reading module. The determination module makes a comparison between the entry order extracted by the extraction module from the information image read out by the reading module and the entry order extracted by the extraction module from the information image read out last time by the reading module, so as to determine whether or not an entry in an order different from the entry order is made. The alarm module issues an alarm when it is determined, by the determination module, that the entry in the order different from the entry order is made.

BRIEF DESCRIPTION OF THE DRAWINGS

Exemplary embodiments of the invention will be described in detail based on the following figures, wherein:

FIGS. 4A and 4B are explanatory diagrams illustrating examples of an electronic document and an information image-combined document;

FIG. 5 is an explanatory diagram illustrating an example of the data structure of an entry order table;

FIG. 6 is an explanatory diagram illustrating an example of the data configuration of a document layout table;

FIG. 8 is a conceptual module configuration diagram of an example of the configuration in accordance with this exemplary embodiment (image reading apparatus);

FIG. 15 is an explanatory diagram illustrating an example of the structure of still another entry order control table;

FIG. 16 is an explanatory diagram illustrating an example of the structure of a further entry order control table;

FIG. 17 is an explanatory diagram illustrating an example of the structure of a still further entry order control table.

DETAILED DESCRIPTION

Hereafter, with reference to the drawings, a description will be given of a preferred exemplary embodiment for implementing the invention.

Figure 1:
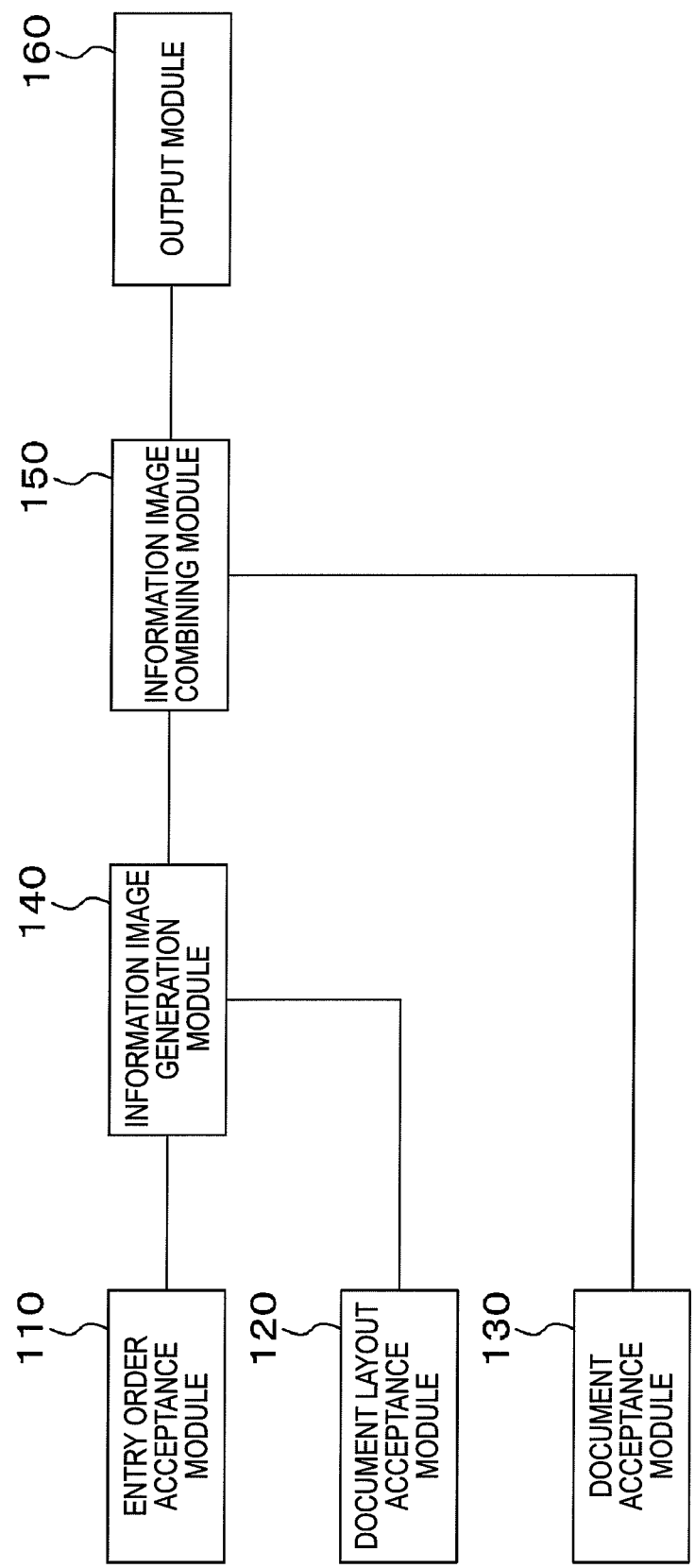
FIG. 1 is a conceptual module configuration diagram of an example of the configuration in accordance with this exemplary embodiment (image output apparatus)

FIG. 1 shows a conceptual module configuration diagram of an example of the configuration in accordance with this exemplary embodiment (image output apparatus).

It is noted that a module generally refers to a logically separable component, such as software (computer program) and hardware. Accordingly, the term "module" used in this exemplary embodiment means not only a module in a computer program but also a module in a hardware configuration. Therefore, the description of this exemplary embodiment also serves as the description of a computer program (a program for allowing a computer to execute respective procedures, a program for allowing a computer to function as respective units, and a program flow allowing a computer to implement respective functions), a system, and a method which serve to function as such modules. It should be noted, however, that although terms "store", "cause something to store", or equivalent terms are used for the convenience of explanation, these terms are to be construed as "to store something in a memory device" or "to control a memory device to store something" when the description of the exemplary embodiment is applied to the computer program. In actual application, however, one module may be configured by one program, plural modules may be configured by one program, and one module may conversely be configured by plural programs. Furthermore, plural modules may be executed by one computer, and one module may be executed by plural computers in a distributed or parallel environment. It is noted that other modules may be included in one module. Furthermore, the term "connection" is used herein not only for physical connection but also for logical connection (e.g., relationships for transmission and reception of data, instructions, and reference between data). The term "predetermined" means "being determined before object processing" and is used meaning not only "being determined before starting processing of the exemplary embodiment" but also "being determined depending upon the current or preceding situation or condition prior to the object processing even after starting processing of the exemplary embodiment".

Also, by a system or an apparatus is meant cases where plural computers, hardware, and apparatuses are configured by being connected to one another through a communication means such as a network (including communication connection in one-to-one correspondence), and also cases where the system or the apparatus is implemented by one computer, hardware, apparatus or the like. The term "apparatus" and the term "system" are used herein as substantially synonymous. The "system" does not include those which are merely social "mechanisms" (social systems) which are based on human agreements or arrangements.

In addition, in a case where plural processing is effected for processing by each module or within a module, object information is read from a storage device for each processing, and after the processing is effected, processing results are written into the storage device. Accordingly, as for reading from the storage device before processing and as for writing into the storage device after processing, there are cases where the description is omitted. It should be noted that, as storage devices used herein, a hard disk, a RAM (random access memory), an external storage medium, a storage device through a communication line, registers in a CPU (central processing unit), or the like may be included.

The image processing apparatus (image output apparatus) in accordance with this exemplary embodiment combines an information image with a document and outputs the combined result, and has an entry order acceptance module 110, a document layout acceptance module 120, a document acceptance module 130, an information image generation module 140, an information image combining module 150, and an output module 160, as shown in the example of FIG. 1.

It is noted that the information image refers to image codes which are systematically created for representing electronic data in a machine-readable form, and will be described later in a specific example with reference to FIG. 7.

The document acceptance module 130 is connected to the information image combining module 150. The document acceptance module 130 accepts a document to be combined with an information image, and delivers the document to the information image combining module 150. It is noted that the document may include text data or, in some cases, electronic data of a graphic, an image, or the like, or a combination thereof, which is subject to output (mainly printing), storage, editing, and retrieval, is replaceable by the document between systems or users, and includes data similar thereto. The "acceptance of a document" includes, for example, accepting an electronic document created by a word processing software, reading an image from a scanner, a camera, or the like, receiving an image from an external apparatus by a facsimile machine through a communication line, reading an electronic document stored in a hard disk (including such as one incorporated in the image processing apparatus and one connected thereto through a network), and the like. The image of the document may be a binary image or a multivalued image (including a color image). The image which is accepted may consist of one page or plural pages. The content of an image is one which has an entry field which is assumed to be handwritten by the user, and an inspection chart, an application form, and the like correspond thereto. It should be noted that the form of the entry field in general is a rectangular area enclosed by a line, but may not be limited thereto, and may be an area enclosed by brackets or the like. Those which are entered in the entry field may be characters, codes such as checks, graphics, and the like if they are written by a below-described digital pen.

The document layout acceptance module 120 is connected to the information image generation module 140. The document layout acceptance module 120 accepts information on the layout of the document accepted by the document acceptance module 130, and delivers the layout information to the information image generation module 140. The term "layout information" referred to herein includes at least information indicating the position and size of the entry field. Additionally, the layout information may also include information indicating the position and size of the document composition (title, paragraphs, drawings, tables, etc.) in outside the entry field.

The entry order acceptance module 110 is connected to the information image generation module 140. The entry order acceptance module 110 accepts the entry order in the entry fields within the document accepted by the document acceptance module 130, and delivers the entry order to the information image generation module 140.

By the "entry order" is meant the order of entry in entry fields with the below-described digital pen in a case where there are plural entry fields in that document. For example, that which corresponds to this is a case where, in an inspection chart serving as a document in a situation where product inspection is conducted at a factory, the order of inspection items is predetermined, check fields (entry fields) for indicating completion of the relevant inspection are provided for the respective inspection items, and a person in charge performs inspection in that order and enters check marks in the check fields each time one inspection is finished. Also, that which corresponds to this is a case where, in an application form having a preparer field, an approver field, and the like, entries by plural persons are required, and its order is predetermined. However, this is the case where entries are made by plural persons and are made by using one electronic pen. The "entry order" may indicate the order of entry on that page, or in a case where the document has plural pages, the "entry order" may indicate the order of entry in the plural pages.

In addition, the designation of the entry order may be received by using the user's mouse, keyboard, touch panel, or the like, or a predetermined entry order may be arranged to be received.

In addition, the entry order which is accepted by the entry order acceptance module 110 may further include an entry order in media with a document printed thereon. The "entry order in media" refers to an order of media into which entries are made with the digital pen in a case where there are plural media with a document printed thereon (paper mainly corresponds to such a medium, but the medium may be a plastic if it is printable, allows writing with the digital pen, and is a paper-like medium). As a specific example, the entry order may be page numbers of that document in a case where entries are made in the order of pages. Alternatively, in a case where entries are not made in the order of pages, the entry order may be an entry order in media which is prescribed independently of the page numbers.

The information image generation module 140 is connected to the entry order acceptance module 110, the document layout acceptance module 120, and the information image combining module 150. The information image generation module 140 generates an information image which is an image indicative of information, on the basis of positional information indicating a position within a document accepted by the document acceptance module 130 and the entry order accepted by the entry order acceptance module 110. The information image generation module 140 generates the information image which is combined in the entry field, by using layout information (specifically, information indicating the position and size of the entry field) accepted by the document layout acceptance module 120 as well as the entry order. The phrase "on the basis of" herein used means that information including at least the positional information and the entry order is embedded in the information image. Namely, it suffices if the positional information and the entry order can be read out when the information image is subjected to analysis. The phrase "positional information which is embedded in the information image" refers to information which allows handwriting with the digital pen to be reproduced in a case where the information image with the positional information embedded therein is read, and X-Y coordinates or the like in that document correspond thereto. Specifically, that which corresponds thereto is a set of X-Y coordinates in the document indicated by an area determined from the position and size of the entry field as the positional information.

In addition, the information image generation module 140 may be adapted to generate an information image on the basis of predetermined information in the case of a final entry field as the entry order in a document. The term "predetermined information" referred to herein is information which indicates that the field is a final entry field. It should be noted that the term "final" may refer to a final entry field in that page, or in a case where there are plural pages in the document, it may refer to a final entry field in that document. For example, "99" or the like corresponds thereto. Furthermore, respective information may be set as different "predetermined information." For example, an arrangement may be provided such that "99" indicates a final entry field in that page, while "999" indicates a final entry field in that document.

In addition, the information image generation module 140 may be adapted to further generate information image on the basis of the number of entry fields within a document. The number of entry fields within a document means a total number of entry fields. Alternatively, the number of entry fields within a document may be a total number of entry fields in that page, or in a case where the document has plural pages, it may be a total number of entry fields in that document. For example, as the entry order for embedment in information image, the entry order and the total number of entry fields may be combined. As a specific example, in a case where the entry order is 5 and the total number of entry fields is 6, "5/6" is used.

In addition, the information image generation module 140 further generates information image on the basis of document information indicating a document. As the document information, document ID (identification) corresponds thereto. It is noted that the document ID will be described in the description of the example of FIG. 3.

Patterns of information which are embedded in the information image generated by the information image generation module 140 include the following.

A first pattern includes:
(A1) positional information
(A2) entry order of entry fields
A second pattern includes:
(B1) document ID
(B2) positional information
(B3) entry order of entry fields
A third pattern includes:
(C1) document ID
(C2) page ID
(C3) positional information
(C4) entry order of entry fields
A fourth pattern includes:
(D1) document ID
(D2) page ID
(D3) positional information
(D4) entry order of entry fields
(D5) entry order of pages Further, the entry order of entry fields of each pattern may include the total number of entry fields. Furthermore, the entry order of pages may include the total number of pages to be entered. It is to be noted that the entry order of pages in (D5) of the fourth pattern may be substituted by the page ID in (D2). However, to cope with a case where the order of entry does not correspond to the page order, the entry order of pages in (D5) is provided in addition to the page ID in (D2) as in the fourth pattern).

The information image combining module 150 is connected to the document acceptance module 130, the information image generation module 140, and the output module 160. The information image combining module 150 combines the information image, which is generated by the information image generation module 140, in the entry field within the document accepted by the document acceptance module 130.

The output module 160 is connected to the information image combining module 150. The output module 160 outputs a document with an information image combined therewith by the information image combining module 150. Falling under the category of the output of an image are printing by a printing apparatus such as a printer, transmitting an image by an image transmitting apparatus such as a facsimile machine, and the like. Also, the output module 160 may effect display on a display unit such as a display, writing an image to an image storage device such as an image database, storing in a storage medium such as a memory card, delivering to another information processing apparatus, and the like, but outputs a document to a medium such as paper so as to allow handwriting with the digital pen.

Figure 2:
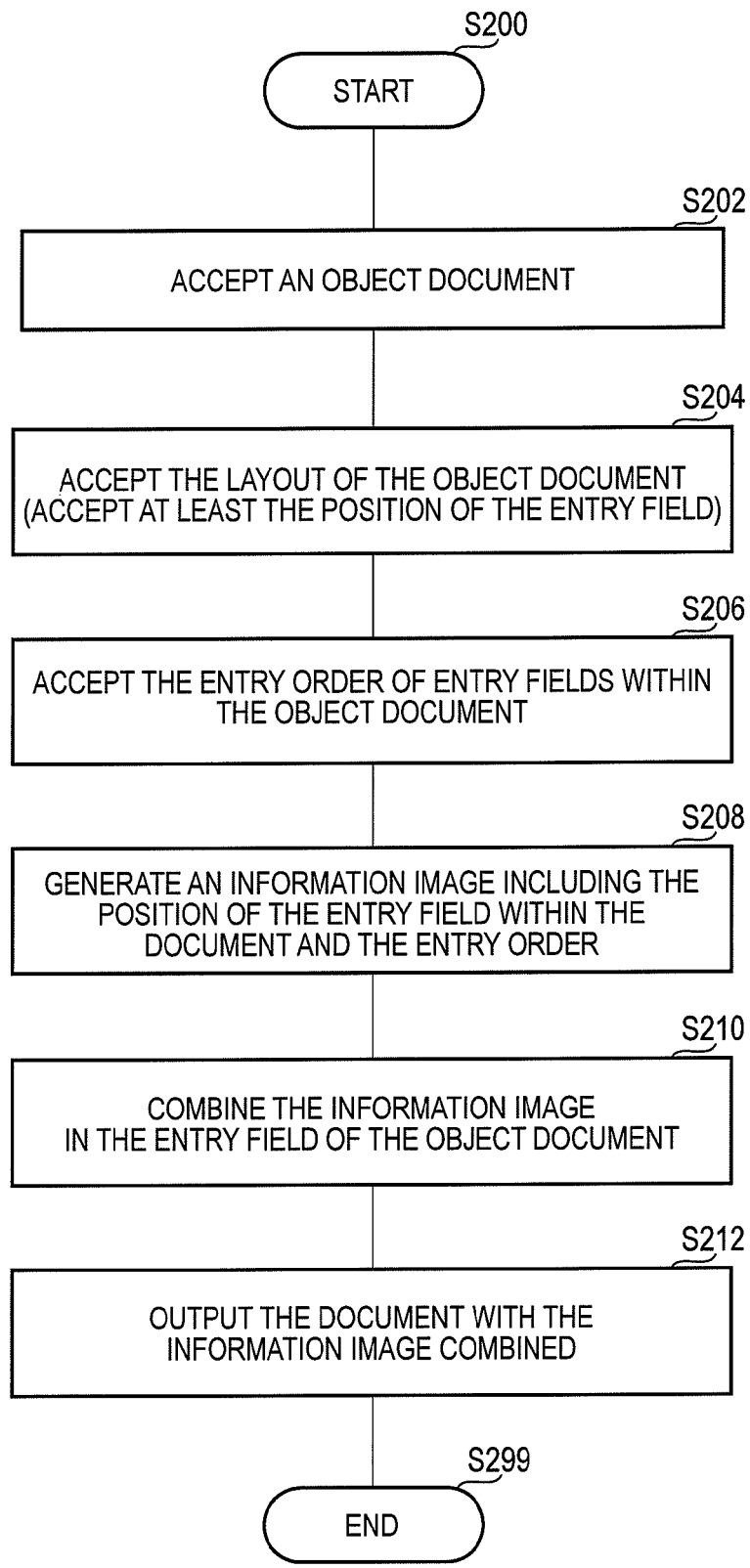
FIG. 2 is a flowchart illustrating an example of processing in accordance with this exemplary embodiment (image output apparatus)

FIG. 2 is a flowchart illustrating an example of processing in accordance with this exemplary embodiment (image output apparatus).

In Step S202, the document acceptance module 130 accepts an object document. In Step S204, the document layout acceptance module 120 accepts the layout (at least the position and size of the entry field) of the object document.

In Step S206, the entry order acceptance module 110 accepts the entry order of entry fields within the object document.

In Step S208, the information image generation module 140 generates information image including the position of the entry field within the document and the entry order. In Step S210, the information image combining module 150 combines the information image in the entry field within the object document.

In Step S212, the output module 160 outputs the document with the information image combined therewith.

Figure 3:
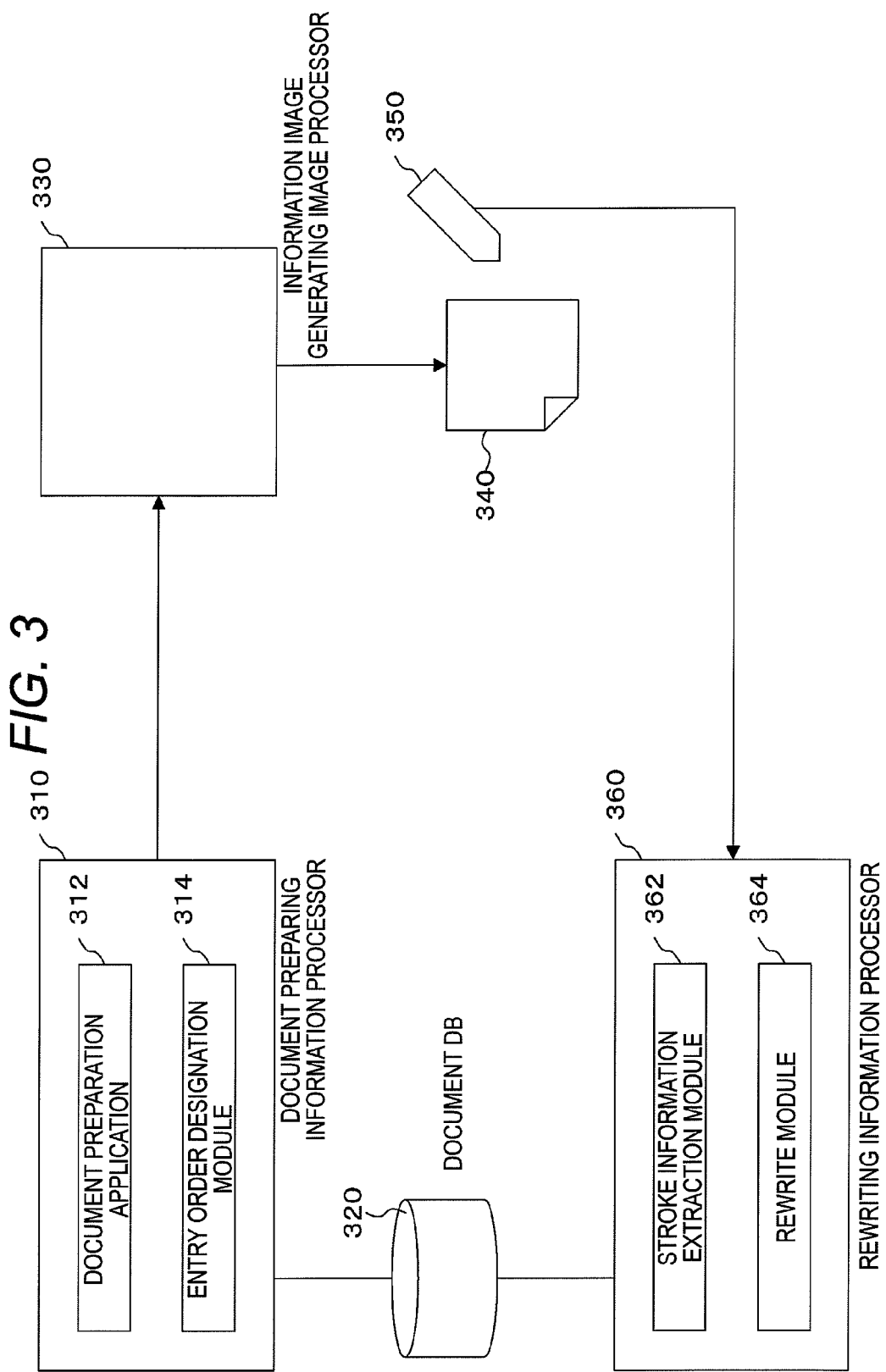
FIG. 3 is an explanatory diagram illustrating an example of a system configuration for implementing this exemplary embodiment.

FIG. 3 is an explanatory diagram illustrating an example of a system configuration for implementing this exemplary embodiment. In the illustrated example, the system includes a document preparing information processor 310, a document DB 320, an information image generating image processor 330, a digital pen 350, and a rewriting information processor 360. However, to allow the digital pen 350 to issue an alarm in a case where entries are made in a different order, it suffices if the information image generating image processor 330 and the digital pen 350 are provided.

This system performs the following processing. An information image containing positional information (coordinate information) is superimposed on an electronic document and is printed by the information image generating image processor 330. As the electronic document with the information image superimposed thereon is read out by the digital pen 350 with a compact camera incorporated therein, handwriting information is accumulated in the digital pen 350 as stroke information. If the digital pen 350 is connected to the rewriting information processor 360 such as a PC by means of a USB or the like, a stroke information extraction module 362 and a rewrite module 364 in the rewriting information processor 360 extract the stroke information from the digital pen 350, specify the original electronic document from the document ID, and rewrite the stroke information to that electronic document. In addition, the digital pen 350 may transmit the stroke information to the rewiring information processor 360 through wireless communication.

The document preparing information processor 310 has a document preparation application 312 and an entry order designation module 314, and is connected to the document DB 320 and the information image generating image processor 330.

The document preparation application 312 is an application program which prepares an electronic document and prints an information image-combined document 340 subject to editing by handwriting.

The entry order designation module 314 designates the order of entry fields. For example, the entry order designation module 314 delivers an entry order table 500 to the information image generating image processor 330. Further, an entry order acceptance module 11*a* in the information image generating image processor 330 accepts the entry order table 500. FIG. 5 is an explanatory diagram illustrating an example of the data structure of the entry order table 500. The entry order table 500 has an entry field ID field 510 and an entry order field 520. The entry field ID field 510 is for storing an entry field ID which is information for uniquely identifying the entry field in the system exemplified in FIG. 3, and the entry order field 520 is for storing the entry order in that document or that page.

The document preparation application 312, at the time of document printing, designates the name of a device for printing (printer name, name of the information image generating image processor 330), generates a document image, delivers it to the information image generating image processor 330 together with the document ID and the entry order designated by the entry order designation module 314, and gives a printing instruction thereto. Order information is embedded, for each entry field, in the printed information image. Further, the prepared electronic document is stored in the document DB 320. In addition, information (e.g., a document layout table 600) concerning the layout of entry fields of the object document is also delivered to the information image generating image processor 330. Further, the document layout acceptance module 120 in the information image generating image processor 330 accepts information concerning the layout.

FIG. 6 is an explanatory diagram illustrating an example of the data configuration of the document layout table 600. The document layout table 600 has an entry field ID field 610, a position field 620, a height field 630, and a width field. The entry field ID field 610 is for storing the entry field ID. The position field 620 is for storing, for example, an upper left position of that entry field. The height field 630 is for storing the height of that entry field. The width field 640 is for storing the width of that entry field.

The document DB 320 is connected to the document preparing information processor 310 and the rewriting information processor 360. The document DB 320 stores the electronic document prepared by the document preparation application 312. Further, the writing information obtained by the digital pen 350 is combined with the stored electronic document by the rewrite module 364.

The information image generating image processor 330 is connected to the document preparing information processor 310, is the image processing apparatus (image output apparatus) shown in the example of FIG. 1, prints the electronic document prepared by the document preparing information processor 310, and outputs an information image-combined document 340 with the information image combined therewith. The information image-combined document 340 is a paper document generated by printing an electronic document, and is a paper document with the positional information superimposed thereon as the information image. It should be noted that the document ID may be embedded in the information image.

Here, with reference to FIGS. 4A and 4B, a description will be given of examples of an electronic document 410 and the information image-combined document 340.

The electronic document 410 exemplified in FIG. 4A is a document prepared by the document preparation application 312 and is stored in the document DB 320. For example, it is assumed that there are six entry fields, and that the order of an entry field 411, an entry field 412, an entry field 413, an entry field 414, an entry field 415, and an entry field 416 is designated as the entry order. In particular, the entry field 416 is a final entry field in this document or page, and if an entry is made in this entry field 416, it is possible to proceed to writing in another document or another page.

The information image-combined document 340 exemplified in FIG. 4B is a paper document printed by the information image generating image processor 330, and writing is effected by the operation of the digital pen 350 by the user. The information image, in which positional information and the respective entry order are embedded, is combined in an entry field 421, an entry field 422, an entry field 423, an entry field 424, an entry field 425, and an entry field 426 of the information image-combined document 340. Further, an information image with the positional information embedded therein is combined in a background 429. It should be noted that the information image may not be combined in the background 429.

Figure 7A:
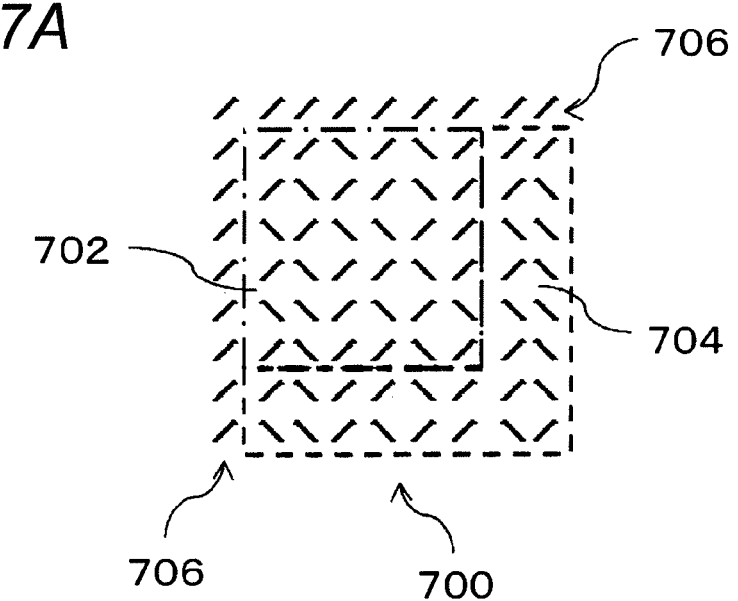
FIGS. 7A to 7C are explanatory diagrams illustrating an example of an information image.
Figure 7B:
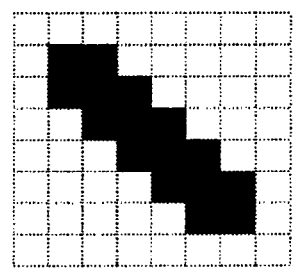
Figure 7C:
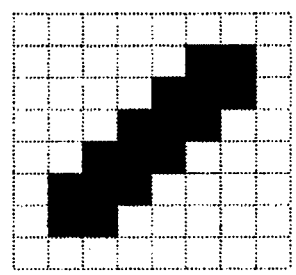

FIGS. 7A to 7C are explanatory diagrams illustrating an example of the information image.

This example, developed at the Palo Alto Research Center of the Xerox Corporation, is a two-dimensional code pattern image which using a glyph code as a code symbol, i.e., an information image, for expressing data by diagonals having differing angles.

In this example, a unit area 700 is a square area consisting of 8 symbols×8 symbols. The value of each symbol is expressed by diagonal patterns, as shown in FIGS. 7B and 7C. In this example, the symbol value of 0 is expressed by a diagonal slanting downward to the right (pattern 0 in the example of FIG. 7B) forming a counterclockwise angle of 45° with respect to a vertical line, while the symbol value of 1 is expressed by a diagonal slanting upward to the right (pattern 1 in the example of FIG. 7C) forming a clockwise angle of 45° with respect to the vertical line.

In this unit area 700, a position code image 702 is a square image consisting of 6 symbols×6 symbols at an upper left corner of the unit area 700, and an identification code image 704 is an image of an inverse L-shaped region remaining after subtracting the square with 6×6 symbols from the unit area 700.

In addition, in this example, a column and a row of synchronizing codes 706 are provided in vertical and horizontal directions along the outer periphery of the unit area 700. In this example, the synchronizing codes 706 are successive diagonal symbols slanting upward to the right ("1"), and the size and arrangement pitch of the symbols are the same as the symbol size and pitch in the unit area 700. The synchronizing codes 706 are provided vertically and horizontally at equal intervals, and each unit area 700 is provided in a square region encompassed by these synchronizing codes 706. The synchronizing codes 706 indicate a demarcation of each unit area 700. Namely, in the apparatus which scans the two-dimensional code pattern image, if it detects a row and a column of successive diagonal symbols slanting upward to the right, it is possible to recognize that the interior of the mesh grid formed by the row and the column is the unit area 700, and that the 6×6 symbols at the upper left corner of that unit area 700 constitute the position code image 702.

It should be noted that insofar as the synchronizing codes 706 are able to specify the location of the unit area 700 or the position code image 702, the synchronizing codes 706 may not be such as those exemplified in FIG. 7A. For example, those in which symbols of a specific shape different from those of the diagonal symbols are arranged at the four corners of the unit area 700 may be used as the synchronizing codes 706. In the example of FIG. 7A, a row and a column having a width corresponding to that of one symbol are used for the synchronizing codes 706. However, if the marks making up the synchronizing codes 706 are sufficiently small, the unit areas 700 may be arranged in two dimensions without gaps and the marks may be positioned in the margins of the adjacent unit areas 700.

In the example of FIG. 7A, one position code image 702 stores a total of 36 symbols, namely, 36 bits of data. Among the 36 bits, 18 bits can be used to encode the x coordinate and 18 bits can be used to encode the y coordinate. If all of both 18-bit coordinates are used to encode the position, 2 to 18 possible positions (approximately 260,000 positions) can be encoded. If each diagonal pattern is formed from 8×8 pixels as shown in FIGS. 7B and 7C and printed at 600 dpi (dots per inch), a length in the vertical or horizontal direction of one dot at 600 dpi is 0.0423 mm so that for both the vertical and horizontal directions the height and width of the two-dimensional code (including the synchronizing codes 706) in FIG. 7A is approximately 3 mm (=8 pixels/symbol×9 symbols× 0.0423 mm). If 260,000 possible positions are encoded at 3 mm intervals, a length of approximately 786 m can be encoded. If the reading accuracy is high, all 18 bits can be used to encode the position. However, in cases where read errors present a problem, it is preferable to include redundancy bits for error detection or error correction. Increasing the proportion of redundancy bits among the 18 bits increases the error detection or error correction capability but decreases the range of positions which can be expressed. Furthermore, in the example of FIG. 7A, the identification code image 704 is positioned in a 2 bit×8 bit rectangular region or a 2 bit×6 bit rectangular region so that a total of 28 bits of identification information can be stored. If 28 bits are used for identification information and the like, approximately 270 million possible (2 to 28) types of identification information and the like can be expressed. However, several of the 28 bits may be used as redundancy bits for error detection or error correction to thereby make it possible to cope with read errors. It is noted that, in this exemplary embodiment, the "identification information and the like" include at least the entry order, and may additionally include the document ID, the page ID, and the like. For example, a sheet identification number or the like for uniquely identifying a sheet may be included.

The identification code images 704 in the unit areas 700 which are printed in entry fields on one sheet are identical. Needless to say, since the positional information expressed by the position code image 702 in the unit area 700 is the information indicating the position in that sheet, the position code images 702 in the respective unit areas 700 are different.

In the above-described example, one bit of data is expressed by one symbol as two diagonal patterns, which are mutually different by 90 degrees, are used as symbols. However, this is only one example. For example, if vertical line and horizontal line patterns are added to the symbols, two bits of information can be expressed by one symbol. In this manner, the number of bits which can be expressed by one symbol can be increased by increasing the number of types of angles for the diagonal patterns of one symbol. Additionally, information images other than glyph codes may be used.

As the user writes down on the information image-combined document 340, the digital pen 350 (also called a pen with a scanner and an electronic pen) reads out an information image, extracts handwriting as stroke information, and transmits it to the rewriting information processor 360. Further, the digital pen 350 detects whether the entry into the entry fields is being carried out according to the entry order and, if not, the digital pen 350 issues an alarm. The configuration of the digital pen 350 and its processing contents will be described later with reference to FIG. 8 and the drawings that follow. It should be noted that the "stroke information" referred to herein is information which is expressed as a series of coordinates acquired by effecting writing into the information image-combined document 340 with the digital pen 350.

The rewriting information processor 360 has the stroke information extraction module 362 and rewrite module 364, and is connected to the document DB 320 and the digital pen 350.

The stroke information extraction module 362 has the function of acquiring from the digital pen 350 the stroke information of handwriting written to the information image-combined document 340. The stroke information includes the document ID, the page number, stroke strings (strings of positional information), and the like of the information image-combined document 340 into which writing has been made.

The "document ID" is information for uniquely identifying a document in the system exemplified in FIG. 3, and the electronic document and a paper document with that electronic document printed thereon have the same document ID. The document ID is required to specify the original electronic document by identifying the paper document subjected to writing by hand. It should be noted that, the document ID is not an essential requirement to allow an alarm to be issued when entries in a different order are made with the digital pen 350. Furthermore, another form may be adopted insofar as the relationship between the electronic document and the paper document can be specified.

The rewrite module 364 is an application program for rewriting to an original electronic document the stroke information which has been written into the information image-combined document 340 with the digital pen 350. The rewrite module 364 performs processing in which the stroke information received from the stroke information extraction module 362 is reflected as stroke information on the electronic document on the basis of information on the document ID and the page ID.

FIG. 8 is a conceptual module configuration diagram of an example of the configuration in accordance with this exemplary embodiment (image reading apparatus). The image processing apparatus (image reading apparatus) in accordance with this exemplary embodiment reads a document with an information image combined therewith, and has a reading module 810, an information image analysis module 820, an entry order control module 830, an alarm module 840, a stroke information generation module 850, and a transmission module 860, as shown in the example of FIG. 8. These modules are accommodated in the digital pen 350 exemplified in FIG. 3.

The reading module 810 is connected to the information image analysis module 820. The reading module 810 is connected to the information image analysis module 820. The reading module 810 reads out the information image, outputted on a medium such as paper, for extracting the position of writing with a writing instrument. The "medium such as paper" herein refers to a document which has combined therewith an information image, i.e., an image representing information generated on the basis of the entry order in the entry fields within the document as well as the positional information indicating the position in that document. In the above-described example, the reading module 810 reads out an image of the writing position in the information image-combined document 340. An image reading module 1052 in the example of FIG. 10 referred to hereinafter corresponds thereto.

Further, the information image which is read out by the reading module 810 may further contain the number of entry fields in the document.

Further, the information image which is read out by the reading module 810 may further contain the entry order in media with a document printed thereon.

Further, the information image which is read out by the reading module 810 may further contain the document information indicating a document.

The information image analysis module 820 has a positional information extraction module 822, an entry order extraction module 824, and a document-related information extraction module 826, and is connected to the reading module 810, the entry order control module 830, and the stroke information generation module 850.

The positional information extraction module 822 analyzes the information image which has been read out by the reading module 810, and extracts positional information. Namely, the positional information extraction module 822 extracts information on the written position, and is thereby able to generate stroke information serving as writing information.

The entry order extraction module 824 analyzes the information image which has been read out by the reading module 810, and extracts the entry order from the identification information or the like.

Further, the entry order extraction module 824 may be adapted to further extract the number of entry fields in the document in a case where the number of entry fields in the document is included in the information image which is read out by the reading module 810.

Furthermore, the entry order extraction module 824 may further extract the entry order in media in a case where an entry order in the medium with a document printed thereon is included in the information image.

The document-related information extraction module 826 analyzes the information image which has been read out by the reading module 810, and extracts information concerning the document from the identification information or the like. The information concerning a document includes, for example, the document ID serving as document information.

The entry order control module 830 has a determination module 832 and an entry order storage module 834, and is connected to the information image analysis module 820 and the alarm module 840.

The determination module 832 makes a comparison between the entry order (hereafter also referred to as the current entry order) extracted by the entry order extraction module 824 from the information image read out by the reading module 810 and the entry order (hereafter also referred to as the previous entry order) extracted by the entry order extraction module 824 from the information image read out last time by the reading module 810, and determines whether or not entries in an order different from the entry order are made. In a case where the entry order is a number which begins with 1 and is added by 1 consecutively up to the number of entry fields, when the current entry order is the same as the previous entry order or the number is increased by 1 from the previous entry order, a determination is made that entries are made in accordance with the entry order. On the other hand, when the current entry order is a number smaller than the previous entry order, a determination is made that entries in an order different from the entry order are made. On the other hand, in a case where the entry order is merely an incremental sequence (the increment is not limited to 1), when the current entry order is a number smaller than the previous entry order, a determination is made that entries in an order different from the entry order are made.

In addition, the determination module 832 may be adapted to determine that in a case where the entry order extracted by the entry order extraction module 824 is the predetermined information, it is an entry into a final entry field within the document. For example, in the case of the above-described "99," a determination is made that it is a final entry field on that page. Further, in a case where the entry order in the information image read out by the reading module 810 last time is "99," a determination is made that entries in an order different from the entry order are not made on condition that the entry order in the information image read out by the reading module 810 this time is "99," or that, if the document ID, the page ID, or the like is provided, the previous document ID, page ID, or the like is different from the current document ID, page ID, or the like.

In addition, in a case where the number of entry fields in the document is included in the information image read out by the reading module 810, the determination module 832 may be adapted to determine whether or not it is an entry into a final entry field within the document on the basis of the number of entry fields and the entry order which have been extracted by the entry order extraction module 824. As for the phrase "on the basis of" herein used, in a case where the entry order is a number which begins with 1 and is added by 1 consecutively up to the number of entry fields, a comparison is made between the number of entry fields and the entry order, and if the entry order and the number of entry fields agree, a determination may be made that it is the writing into a final entry field. Furthermore, in a case where the entry order is merely an incremental sequence, the number of entry orders which have been read is counted, and a comparison is made between the count number and the number of entry fields, and if the count number and the number of entry fields agree, a determination may be made that it is the writing into a final entry field.

In addition, in a case where the information image contains the entry order in media with a document printed thereon, the determination module 832 may be adapted to determine whether or not entries in an order different from the entry order are made by making a comparison between the entry order in media and the entry order in media within the information image read out last time by the reading module 810. To make this determination, it suffices if the entry order storage module 834 is adapted to store the previous entry order for each medium.

In addition, in a case where the information image contains the document information indicating a document, the determination module 832 may be adapted to determine whether or not entries in an order different from the entry order are made by making a comparison between the entry order or entry order in media extracted by the entry order extraction module 824 and the previous entry order or entry order in media stored for each document information item.

Figures 10, 11, 12, 13:
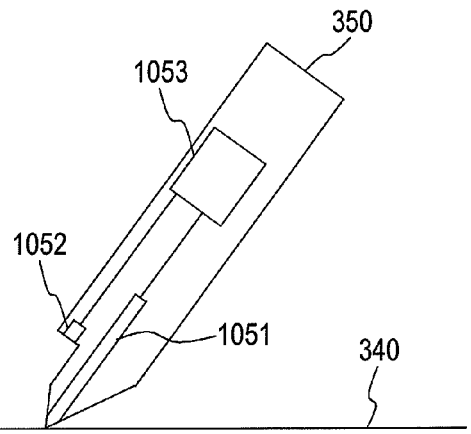
FIG. 10 is an explanatory diagram illustrating an example of the structure of a digital pen.
FIG. 11 is an explanatory diagram illustrating an example of the data structure of a stroke information table.
FIG. 12 is an explanatory diagram illustrating an example of the data structure of an entry order control table.
FIG. 13 is an explanatory diagram illustrating an example of the structure of another entry order control table.

The entry order storage module 834 stores the entry order extracted by the entry order extraction module 824. For example, the entry order storage module 834 stores an entry order control table 1200. FIG. 12 is an explanatory diagram illustrating an example of the data structure of the entry order control table 1200. The entry order control table 1200 has a final entry order field 1210. When the determination is made by the determination module 832, the final entry order field 1210 has stored therein the previous entry order in the information image read out by the reading module 810, and after the determination is made, the final entry order field 1210 has stored therein the current entry order in the information image read out by the reading module 810. Accordingly, at the point of time of determination, the determination module 832 is able to make a comparison between the previous entry order in the information image read out by the reading module 810 and the current entry order in the information image read out by the reading module 810.

The alarm module 840 is connected to the entry order control module 830 and issues an alarm when it is determined by the determination module 832 that entries in an order different from the entry order are made. For instance, a speaker, a light source, a vibrator, and the like may be incorporated in the alarm module 840. The form of the alarm issued may be a sound (a warning sound, a vocal warning, etc.), light (blinking of a light source, output of a predetermined color, etc.), or vibration.

The determination which is made by the determination module 832 and the issuance of an alarm by the alarm module 840 are irrelevant to whether or not writing is actually being done. When the information image is read by the reading module 810 prior to writing, the alarm module 840 may possibly issue an alarm before the writing is done, or when the reading module 810 has read out the information image midway during writing, the alarm module 840 issues an alarm while writing is being done.

In addition, the termination of an alarm may be effected after the elapse of a predetermined time period after the issuance of the alarm, or may be effected until it is determined by the determination module 832 that entries in an order different from the entry order are not being made, or may be effected until an operation for forcibly terminating the alarm is made by an operator. It should be noted that in the case where it is decided to continue the alarm until it is determined by the determination module 832 that entries in an order different from the entry order are not being made, the "information image read out last time by the reading module 810 on a second occasion and thereafter" refers to an information image read out last time by the reading module 810 in the case where it is determined by the determination module 832 that entries in an order different from the entry order are made. For this reason, it suffices if the entry order storage module 834 is prepared, and if the entry order storage module 834 stores the entry order in the case where it is determined by the determination module 832 that entries in an order different from the entry order are not being made, and the entry order storage module 834 does not store the entry order in the case where it is determined that entries in an order different from the entry order are being made. Namely, the "previous entry order" means the entry order in the case where it is determined that entries in an order different from the entry order are not being made.

The stroke information generation module 850 is connected to the information image analysis module 820 and the transmission module 860. The stroke information generation module 850 generates stroke information on the basis of the positional information extracted by the positional information extraction module 822 and the document related information extracted by the document-related information extraction module 826. For example, the stroke information generation module 850 may be adapted to generate a stroke information table 1100. FIG. 11 is an explanatory diagram illustrating an example of the data structure of the stroke information table 1100. The stroke information table 1100 has a document ID field 1110, an X-coordinate field 1120, and a Y-coordinate field 1130. The document ID field 1110 stores the document ID which is the document information extracted by the document-related information extraction module 826. The X-coordinate field 1120 and the Y-coordinate field 1130 store the X-coordinate and the Y-coordinate which are the positional information extracted by the positional information extraction module 822.

The transmission module 860 is connected to the stroke information generation module 850. The transmission module 860 transmits the stroke information generated by the stroke information generation module 850 to the above-described rewriting information processor 360. It should be noted that the generated stroke information may be accumulated in an unillustrated stroke information storage module, and the transmission module 860 may transmit the accumulated stroke information to the rewriting information processor 360 when the image reading apparatus (digital pen 350) and the rewriting information processor 360 are connected.

Figure 9:
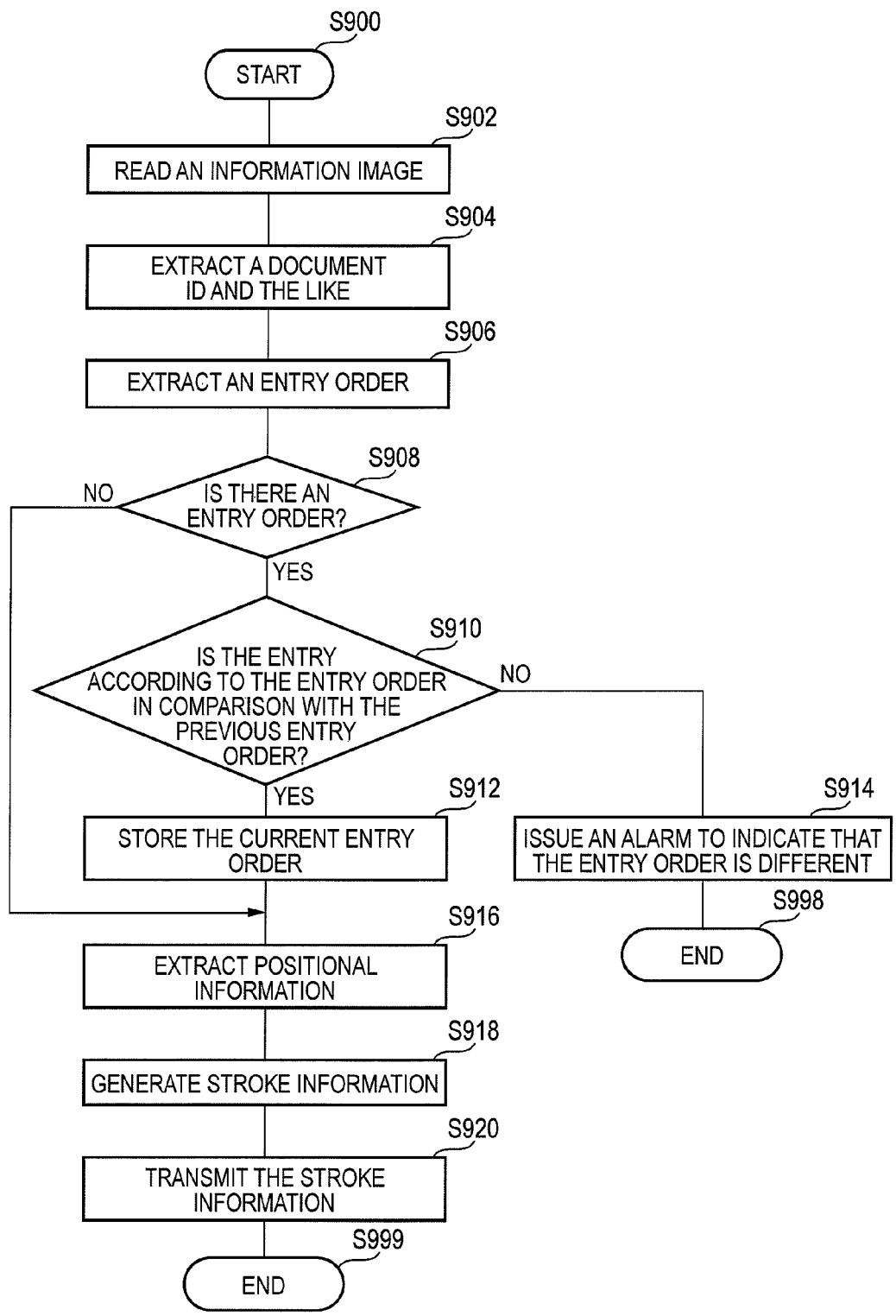
FIG. 9 is a flowchart illustrating an example of processing in accordance with this exemplary embodiment (image reading apparatus)

FIG. 9 is a flowchart illustrating an example of processing in accordance with this exemplary embodiment (image reading apparatus).

In Step S902, the reading module 810 reads out an information image printed on the information image-combined document 340.

In Step S904, the document-related information extraction module 826 extracts the document ID and the like from within the information image.

In Step S906, the entry order extraction module 824 extracts the entry order from within the information image.

In Step S908, the determination module 832 determines whether or not there is an entry order and, if there is, the process proceeds to Step S910 and, if not, the process proceeds to Step S916.

In Step S910, the determination module 832 makes a comparison between the current entry order and the previous entry order to determine whether or not the entry is being carried out according to the entry order and, if it is being carried out according to the entry order, the process proceeds to Step S912 and, if not, the process proceeds to Step S914.

In Step S912, the entry order storage module 834 stores the current entry order. It should be noted that in the case where the processing has proceeded to Step S914 in the determination of Step S910, since the processing of Step S912 is not carried out, the entry order stored by the entry order storage module 834 still remains to be the previous entry order.

In Step S914, the alarm module 840 issues an alarm indicating that the entry order differs.

In Step S916, the positional information extraction module 822 extracts the positional information.

In Step S918, the stroke information generation module 850 generates the stroke information.

In Step S920, the transmission module 860 transmits the stroke information.

FIG. 10 is an explanatory diagram illustrating an example of the structure of the digital pen 350. The digital pen 350 has a tip 1051, the image reading module 1052, and a control/transmission module 1053. The reading module 810 exemplified in FIG. 8 is implemented by the image reading module 1052, and the information image analysis module 820, the entry order control module 830, the alarm module 840, the stroke information generation module 850, and the transmission module 860 are implemented by the control/transmission module 1053.

Characters and the like are written on the information image-combined document 340 by the tip 1051 in correspondence with the operator's operation of the digital pen 350. Further, the image reading module 1052 performs relatively high-speed continuous imaging of, e.g., several tens to hundred and several tens of frames per second or thereabouts, and outputs a scanned image to the control/transmission module 1053 after scanning each frame. The control/transmission module 1053 detects the synchronizing codes 706 from the image read out by the image reading module 1052. In the case of the code pattern image such as the one in the example of FIG. 7A, a row and a column where a row and a column of successive diagonal patterns slanting upward to the right appear are detected as the row and the column of the synchronizing codes 706. It should be noted that, as the synchronizing codes, it is possible to use various ones which have hitherto been proposed other than those exemplified in FIG. 7A. Such synchronizing codes can be detected by conventional detecting methods corresponding to their types.

The position code image 702 and the identification code image 704 are extracted from the scanned image. The control/transmission module 1053 regenerates positional information, identification information, and the like by subjecting the position code image 702 and the identification code image 704 to code recognition processing. Generally speaking, the code recognition processing which is performed here is reverse processing to the information image generation processing. To describe the identification code image 704 as a typical example, the control/transmission module 1053 first determines values of the respective symbols by recognizing diagonal symbols from the identification code image 704, and determines an identification code matrix in which the values of the symbols are arranged in correspondence with the arrangement position of the symbols in the identification code image 704. Then, serial identification codes are determined with respect to this identification code matrix, and these identification codes are subjected to decoding processing corresponding to the encoding method to thereby decode the identification information. The positional information can be decoded by equivalent processing with respect to the position code image 702 as well. The positional information, identification information, and the like are determined by performing the above-described extraction and recognition processing for each frame.

The positional information and identification information thus determined from the scanned image of each frame are provided to and utilized by the rewriting information processor 360 which makes use of these information items. For example, in the case of the rewriting information processor 360 which fetches as electronic information those writing marks that have been written by the operator to a sheet with an information image printed thereon with the digital pen 350, processing is performed in which the sheet is specified from the identification information to acquire an original document on the sheet, a locus of the operator's writing is obtained from the positional information acquired from each frame consecutively read out, and an image representing that locus is superimposed on the original document and is recorded.

The entry order storage module 834 may be adapted to store an entry order control table 1300. FIG. 13 is an explanatory diagram illustrating an example of the structure of the entry order control table 1300. The entry order control table 1300 stores the information contained in the information image read out last time by the reading module 810, and has a document ID field 1310, a page ID field 1320, and a final entry order field 1330. The document ID field 1310 has stored therein the document ID read out last time by the reading module 810. The page ID field 1320 has stored therein the page ID within that information image. The final entry order field 1330 has stored therein the entry order within that information image.

Figure 14:
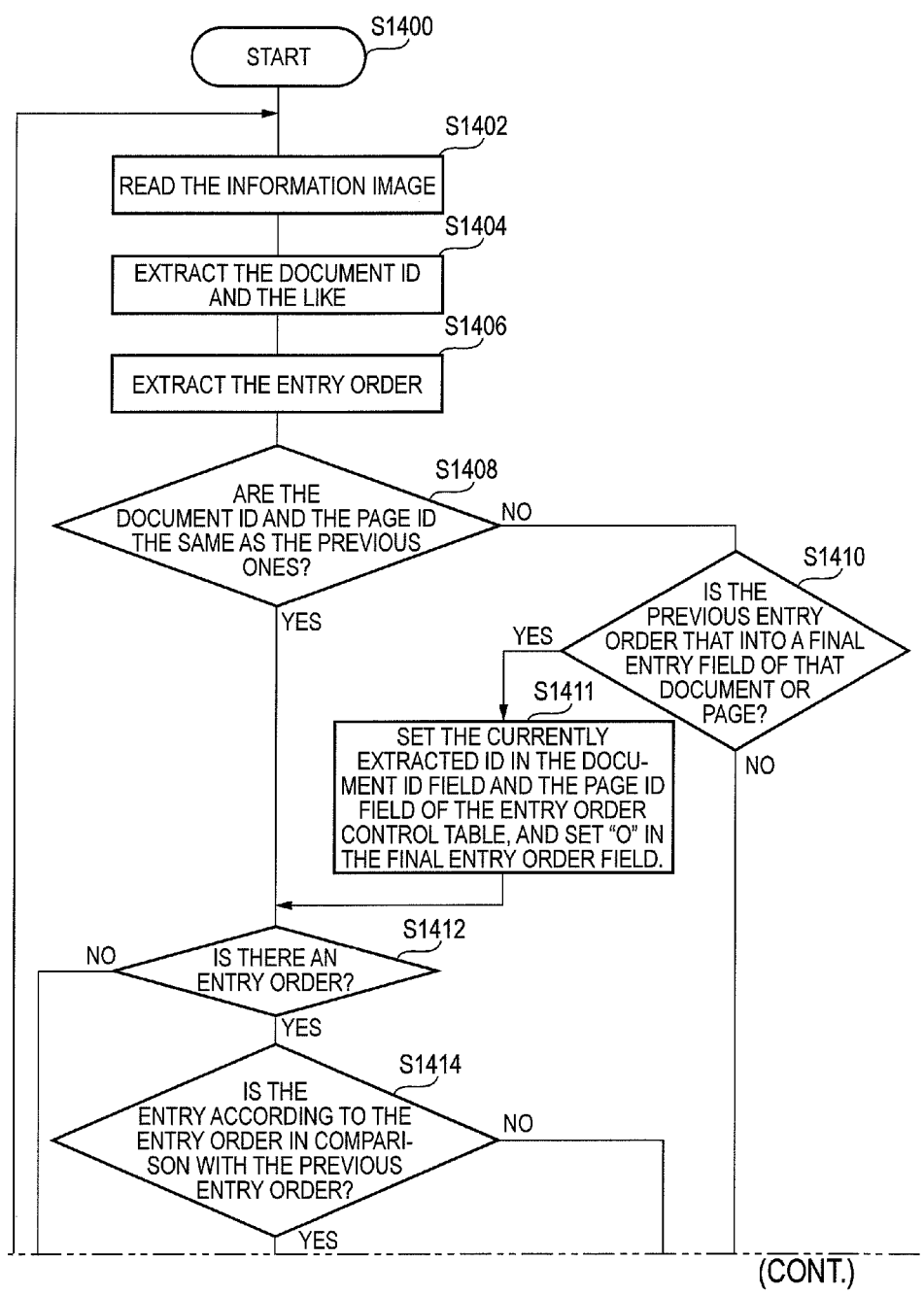
FIG. 14 is a flowchart illustrating an example of processing in accordance with this exemplary embodiment (image reading apparatus)

FIG. 14 is a flowchart illustrating an example of processing in accordance with this exemplary embodiment (image reading apparatus). This flowchart shows an example of processing which makes use of the entry order control table 1300 so as to employ not only the entry order of fields but also the entry order of pages and documents. In addition, this is an example of processing for allowing the information image to be read successively a plurality of times including processing after the issuance of an alarm.

Steps S1402 through S1406 provide processing equivalent to those of Steps S902 through S906 exemplified in FIG. 9.

In Step S1408, the determination module 832 determines whether or not the document ID and the page ID read out this time are the same as the previous document ID and page ID within the entry order control table 1300 and, if they are the same, the process proceeds to Step S1412 and, if not, the process proceeds to Step S1410.

In Step S1410, the determination module 832 determines whether or not the previous entry order is that into a final entry field of the previous document or page. In the case of the final entry field (in the case where the processing proceeded to another document or page after entering into the final entry field of that document or page), the process proceeds to Step S1411. In the other cases (in the case where the processing proceeded to another document or page despite that an entry has not been made into the final entry field of that document or page), the process proceeds to Step S1418. For example, in a case where the previous entry order is predetermined information (information indicating that it is a final entry field), the process proceeds to Step S1411. On the other hand, in a case where the total number of entry fields in the document is contained in the information image, if the previous entry order and the total number of the previous entry fields are identical, the process proceeds to Step S1411.

In Step S1411, the entry order storage module 834 sets the document ID and the page ID extracted this time (extracted in Step S1404) in the document ID field 1310 and the page ID field 1320 of the entry order control table 1300, and set a "0," i.e., an initial value, into the final entry field 1330. Next, the operation proceeds to Step S1412.

In Step S1412, the determination module 832 determines whether or not there is an entry order and, if there is, the operation proceeds to Step S1414 and, if not, the operation proceeds to Step S1420.

In Step S1414, the determination module 932 makes a comparison between the current entry order (entry order extracted in Step S1406) and the previous entry order (final entry order field 1330 of the entry order control table 1300) to determine whether or not the entry is being carried out according to the entry order and, if it is being carried out according to the entry order, the process proceeds to Step S1416 and, if not, the operation proceeds to Step S1418.

In Step S1416, the entry order storage module 834 sets values of the current document ID (extracted in Step S1404), page ID (page ID extracted in Step S1404), and final entry order (entry order extracted in Step S1406) in the document ID field 1310, the page ID field 1320, and the final entry order field 1330 of the entry order control table 1300.

In Step S1418, the alarm module 840 issues an alarm indicating that the entry order is different. After the issuance of the alarm, the operation proceeds to Step S1426.

In Step S1420, the positional information extraction module 822 extracts the positional information.

In Step S1422, the stroke information generation module 850 generates the stroke information.

In Step S1424, the aforementioned stroke information storage module stores the stroke information.

In Step S1426, a determination is made as to whether or not another image to be read out is present and, if there is, the operation proceeds to Step S1402 and, if not, the operation proceeds to Step S1428.

In Step S1428, the transmission module 860 transmits the stroke information stored in the stroke information storage module.

In addition, in the case where the total number of entry fields in the document is embedded in the information image, the entry order storage module 834 may store an entry order control table 1500, and the determination module 832 may make a determination by using the entry order control table 1500. FIG. 15 is an explanatory diagram illustrating an example of the structure of the entry order control table 1500. The entry order control table 1500 stores the information contained in the information image read out last time by the reading module 810, and has a document ID field 1510, a page ID field 1520, a final entry order field 1530, and a total-number-of-entry-fields field 1540. The document ID field 1510, the page ID field 1520, and the final entry order field 1530 are equivalent to the document ID field 1310, the page ID field 1320, and the final entry order field 1330 of the entry order control table 1300 exemplified in FIG. 13. The total-number-of-entry-fields field 1540 has stored therein the total number of entry fields embedded in that information image. If the value in the final entry order field 1530 and the value in the total-number-of-entry-fields field 1540 are identical, it shows that an entry is being made into the entry field where a final entry is to be made in that document or page.

In addition, in the case where the document has plural pages and the entry order is designated for each page, the entry order storage module 834 may be adapted to store an entry order control table 1600, and the determination module 832 may be adapted to make a determination by using the entry order control table 1600. FIG. 16 is an explanatory diagram illustrating an example of the data structure of the entry order control table 1600. The entry order control table 1600 stores the information contained in the information image read out last time by the reading module 810, and has a document ID field 1610, a page ID field 1620, a final entry order field 1630, a total-number-of-entry-fields field 1640, a final entry page order field 1650, and a total-number-of-entry-pages field 1660. The document ID field 1610, the page ID field 1620, the final entry order field 1630, and the total-number-of-entry-fields field 1640 are equivalent to the document ID field 1510, the page ID field 1520, the final entry order field 1530, and the total-number-of-entry-fields field 1540 of the entry order control table 1500 exemplified in FIG. 15. The final entry page order field 1650 has stored therein the page order in that information image. The total-number-of-entry-pages field 1660 has stored therein the total number of pages embedded in that information image. If the value in the final entry page order field 1650 and the value in the total-number-of-entry-pages field 1660 are identical, it shows that an entry is being made into the page where a final entry is to be made in that document.

In addition, in a case where writing is performed in parallel into plural documents, the entry order storage module 834 may be adapted to store an entry order control table 1700, and the determination module 832 may be adapted to make a determination by using the entry order control table 1700. FIG. 17 is an explanatory diagram illustrating an example of the data structure of the entry order control table 1700. The entry order control table 1700 stores plural items (its number is the number of documents into which writing is performed in parallel) of the information in the information image read last time by the reading module 810, and has a document ID field 1710, a page ID field 1720, a final entry order field 1730, and a total-number-of-entry-fields field 1740. The document ID field 1710, the page ID field 1720, the final entry order field 1730, and the total-number-of-entry-fields field 1740 are equivalent to the document ID field 1510, the page ID field 1520, the final entry order field 1530, and the total-number-of-entry-fields field 1540 of the entry order control table 1500 exemplified in FIG. 15. However, items of the information which is stored in each field correspond to the number of documents into which writing is performed in parallel.

The determination module 832 makes a determination by using the document IDs in the information image read out this time and the respective corresponding items of information at rows in the entry order control table 1700. Ion consequence, even if an entry is made into page 2 of a document B while an entry is being made into page 1 of a document A, it is possible to determine whether or not the entry order in each document is not mistaken.

In addition, items of information which are stored in the respective fields of the entry order control table 1600 exemplified in FIG. 16 may be so arranged to be stored in a number equivalent to the number of documents into which writing is performed in parallel as in the entry order control table 1700.

Figure 18:
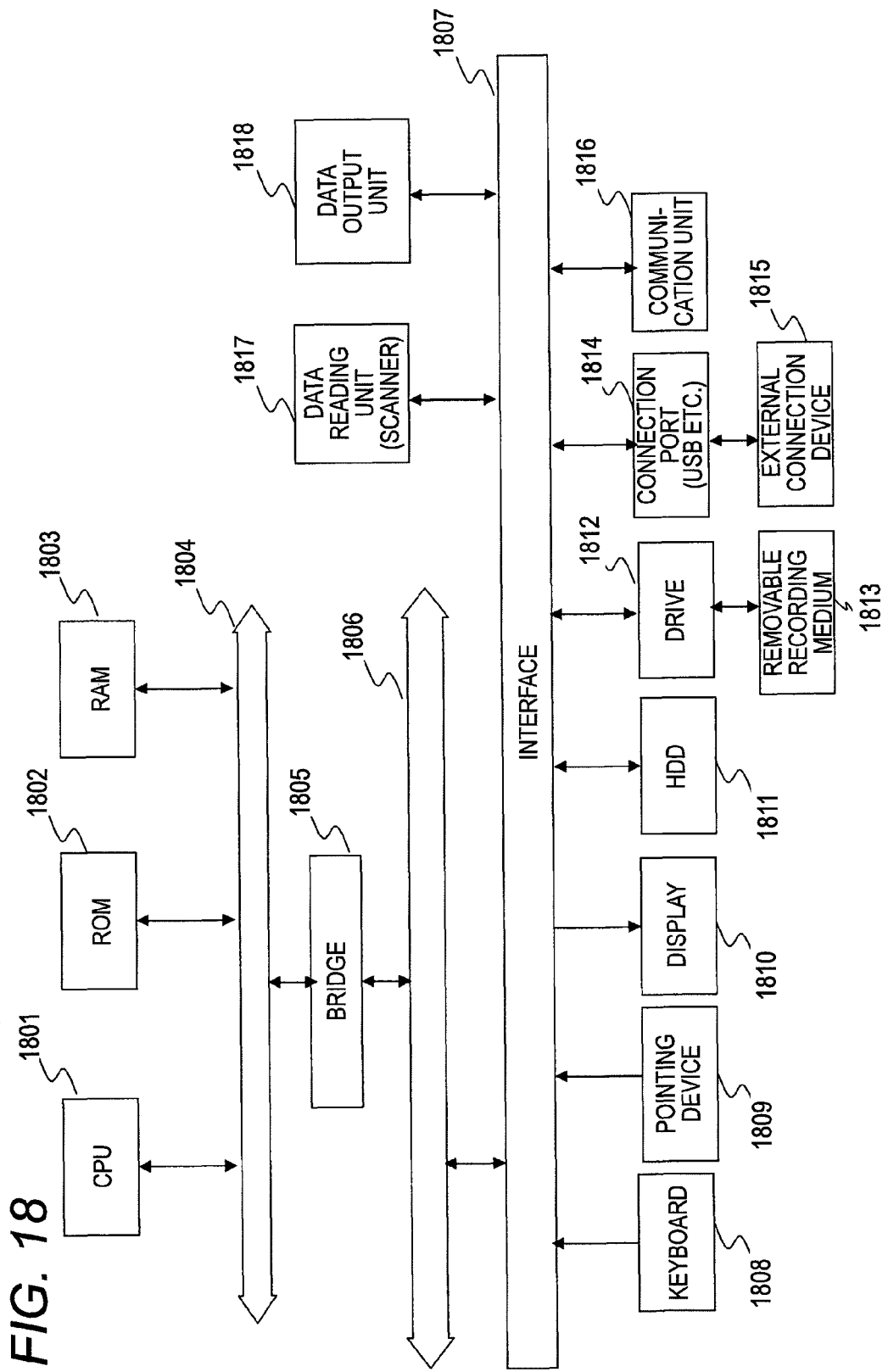
FIG. 18 is a block diagram illustrating an example of the hardware configuration of a computer for implementing this exemplary embodiment.

Referring to FIG. 18, a description will be given of an example of the hardware construction of the image processing apparatus (image output apparatus, the document preparing information processor 310, the rewriting information processor 360, and the image reading apparatus) in accordance with this exemplary embodiment. The example shown in FIG. 18 is configured by such as a personal computer (PC), and is an example of the hardware configuration in which a data reading unit 1817 such as a scanner and a data output unit

1818 such as a printer are provided. It should be noted that the digital pen 350 serving as an image reading apparatus is configured by, among others, a CPU 1801, a ROM (read only memory) 1802, a RAM 1803, the data reading unit 1817, a communication unit 1816, and a bus connecting them.

The CPU 1801 is a control unit which executes processing in accordance with a computer program describing execution sequences of the various modules described in the above-described exemplary embodiment, i.e., the entry order acceptance module 110, the document layout acceptance module 120, the document acceptance module 130, the information image generation module 140, the information image combining module 150, the document preparation application 312, the entry order designation module 314, the stroke information extraction module 362, the rewrite module 364, and the like.

The ROM 1802 stores programs, operation parameters, and the like which are used by the CPU 1801. The RAM 1803 stores such as the programs used in the execution by the CPU 1801 and the parameters which are varied, as required, in the execution thereof. These are connected to each other by a host bus 1804 constituted by a CPU bus or the like.

The host bus 1804 is connected to an external bus 1806 such as a PCI (peripheral component interconnect/interface) through a bridge 1805.

A keyboard 1808 and a pointing device 1809 such as a mouse are input devices which are operated by the operator. A display 1810 includes a liquid crystal display, a CRT (cathode ray tube), and the like to display various information as a text and image information.

A HDD (hard disk drive) 1811 incorporates a hard disk and records or reproduces a program, which is executed by the CPU 1801, and information by driving the hard disk. Stored in the hard disk are such as an electronic document, an information image, an electronic document with an information image combined therewith, and a document ID which are accepted. Further, other various computer programs such as various data processing programs and the like are stored therein.

A drive 1812 reads out data or a program recorded in a removable recording medium such as a magnetic disk, an optical disk, a magneto-optical disk, a semiconductor memory, or the like which is installed in the computer, and supplies the data or the program to the RAM 1803 connected thereto via an interface 1807, the external bus 1806, the bridge 1805, and the host bus 1804. The removable recording medium 1813 is also usable as a data recording area in the same way as the hard disk.

A connection port 1814 is a port for connecting to an external connection device 1815 and has a connecting part such as a USB or IEEE 1394 port. The connection port 1814 is connected to the CPU 1801 and the like via the interface 1807, the external bus 1806, the bridge 1805, the host bus 1804, and the like. The communication unit 1816 is connected to a network (including a wired or wireless one) and executes data communication processing with an external circuit. The data reading unit 1817 is, for example, a scanner, and executes read processing of a document. The data output unit 1818 is, for example, a printer, and executes output processing of document data.

It should be noted that the hardware configuration of the image processing apparatus shown in FIG. 18 shows one configuration example, and the exemplary embodiment is not limited to the configuration shown in FIG. 18 and suffices if it has a configuration capable of executing the modules described in this exemplary embodiment. For example, some modules may be configured by exclusive-use hardware (e.g., an application specific integrated circuit (ASIC) or the like), or it is possible to adopt a form in which some modules are disposed in an external system and are connected thereto via a communication line. Still alternatively, a plurality of systems each shown in FIG. 18 may be connected to each other via communication lines so as to effect mutually cooperative operation. In addition, the system in accordance with the invention may be incorporated in a copying machine, a facsimile machine, a scanner, a printer, a combination machine (an image processing apparatus having at least two functions of a scanner, a printer, a copying machine, a facsimile machine, and the like).

It should be noted that the above-described programs may be provided by being stored in a storage medium, or may be provided through a communication means. In that case, the above-described programs may be construed as an invention of a "computer readable recording medium with a program recorded therein."

The "computer readable recording medium with a program recorded therein" refers to a "recording medium which has a program recorded therein and is readably by a computer" and which is used for such as the installation and execution of a program and the circulation of a program.

It should be noted that the recording media include, for example, "DVD-R, DVD-RW, DVD-RAM, and the like" which are digital versatile disks (DVDs) and are standards adopted by the DVD Forum, "DVD+R, DVD+RW, and the like" which are standards adopted by the DVD+RW Forum, compact disks (CDs) including read only memory (CD-ROM), CD-recordable (CD-R), and CD-rewritable (CD-WR), Blu-ray Disc (registered trademark), magneto-optic disk (MO), flexible disk (FD), magnetic tape, hard disk, read only memory (ROM), electrically erasable programmable read-only memory (EEPROM), flash memory, random access memory (RAM), and the like.

In addition, the above-described programs or parts thereof may be stored or circulated by being stored in the recording medium. Still alternatively, the above-described programs or parts thereof may be transmitted via communication, e.g., through a wired or wireless communication network which is used in such as a local area network (LAN), a metropolitan area network (MAN), a wide area network (WAN), the internet, an intranet, and an extranet, and by using a transmission medium combining them, or may be transported by being carried on carrier waves.

Further, the above-described programs may be parts of other programs, or may be recorded in a recording medium together with separate programs. Furthermore, the above-described programs may be recorded in a plurality of recording media in a divided manner. Still alternatively, the above-described programs may be recorded in any form insofar as they are recoverable.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS AND SIGNS

110: entry order acceptance module
120: document layout acceptance module
130: document acceptance module
140: information image generation module
150: information image combining module
160: output module
310: document preparing information processor
312: document preparation application
314: entry order designation module
320: document DB
330: information image generating image processor
340: information image-combined document
350: digital pen
360: rewriting information processor
362: stroke information extraction module
364: rewrite module
810: reading module
820: information image analysis module
822: positional information extraction module
824: entry order extraction module
826: document-related information extraction module
830: entry order control module
832: determination module
834: entry order storage module
840: alarm module
850: stroke information generation module
860: transmission module
1051: tip
1052: image reading module
1053: control/transmission module

What is claimed is:

1. An image processing apparatus comprising an image output apparatus and an image reading apparatus,
wherein the image output apparatus includes:
an entry order acceptance module that accepts an entry order in entry fields within a document;
an information image generation module that generates an information image representing given information based on positional information representing a position in the document and the entry order accepted by the entry order acceptance module;
a combining module that combines the information image generated by the information image generation module in the entry field within the document; and
an image output module that outputs the document with the information image combined with the document by the combining module; and
the image reading apparatus includes:
a reading module that reads the information image which is outputted to a medium by the image output device and which is for extracting a position of writing with a writing instrument;
an extraction module that extracts the entry order by analyzing the information image read out by the reading module;
a determination module that makes a comparison between the entry order extracted by the extraction module from the information image read out by the reading module and the entry order extracted by the extraction module from the information image read out last time by the reading module, so as to determine whether or not an entry in an order different from the entry order is made; and
an alarm module that issues an alarm when it is determined, by the determination module, that the entry in the order different from the entry order is made.

2. An image processing apparatus comprising:
an entry order acceptance module that accepts an entry order in entry fields within a document;
an information image generation module that generates an information image representing given information based on positional information representing a position in the document and the entry order accepted by the entry order acceptance module;
a combining module that combines the information image generated by the information image generation module in the entry field within the document; and
an image output module that outputs the document with the information image combined with the document by the combining module.

3. The image processing apparatus according to claim 2, wherein the information image generation module generates the information image based on predetermined information when the entry order is final within the document.

4. The image processing apparatus according to claim 2, wherein the information image generation module further generates information image further based on the number of entry fields in the document.

5. The image processing apparatus according to claim 2, wherein the entry order accepted by the entry order acceptance module further includes the entry order in medium on which the document is printed.

6. The image processing apparatus according to claim 2, wherein the information image generation module generates information image further based on document information indicating the document.

7. An image processing apparatus comprising:
a reading module that reads an information image for extracting a position of writing with a writing instrument with respect to a document with which is combined the information image representing information generated based on an entry order in entry fields within the document and positional information indicating a position in the document;
an extraction module that extracts the entry order by analyzing the information image read out by the reading module;
a determination module that makes a comparison between the entry order extracted by the extraction module from the information image read out by the reading module and the entry order extracted by the extraction module from the information image read out last time by the reading module, so as to determine whether or not an entry in an order different from the entry order is made; and
an alarm module that issues an alarm when it is determined, by the determination module, that the entry in the order different from the entry order is made.

8. The image processing apparatus according to claim 7, further comprising:
a termination determining module that determines it is an entry into a final entry field within the document when the entry order extracted by the extraction module is predetermined information.

9. The image processing apparatus according to claim 7, wherein the information image read by the reading module further includes the number of entry fields in the document, and
the extraction module further extracts the number of the entry fields in the document, the image processing apparatus further comprising:

a termination determining module that determines whether or not the entry is an entry into a final entry field within the document, based on the number of entry fields and the entry order extracted by the extraction module.

10. The image processing apparatus according to claim 7, wherein the information image read by the reading module further includes an entry order in medium on which the document is printed, the extraction module further extracts the entry order in medium, and the determination module makes a comparison between the entry order in medium and the entry order in medium within the information image read by the reading module so as to determine whether or not an entry in an order different from the entry order is made.

11. The image processing apparatus according to claim 7, wherein the information image which is read by the reading module further includes document information indicating the document, the extraction module further extracts the document information, and the determination module makes a comparison between the entry order or the entry order in media extracted by said extraction module and a previous entry order or entry order in media stored for each item of document information, so as to determine whether or not an entry in an order different from the entry order is made.

12. A non-transitory computer readable medium storing a program causing a computer to execute a process for image processing, the process comprising:

reading an information image for extracting a position of writing with a writing instrument with respect to a document with which is combined the information image representing information generated based on an entry order in entry fields within the document and positional information indicating a position in the document;

extracting the entry order by analyzing the information image read out by the reading step;

making a comparison between the entry order extracted by the extraction step from the information image read out by the reading step and the entry order extracted by the extraction step from the information image read out last time by the reading step, so as to determine whether or not an entry in an order different from the entry order is made; and issuing an alarm when it is determined, by the determination step, that the entry in the order different from the entry order is made.

* * * * *